United States Patent [19]

Kani

[11] Patent Number: 4,461,433
[45] Date of Patent: Jul. 24, 1984

[54] TAPE SPEED CONTROL APPARATUS

[75] Inventor: Tetsuo Kani, Sagamihara, Japan

[73] Assignee: Sony Corporation, Tokyo, Japan

[21] Appl. No.: 368,105

[22] Filed: Apr. 14, 1982

[30] Foreign Application Priority Data

Apr. 14, 1981 [JP] Japan .................................. 56-56043

[51] Int. Cl.³ .................... B65H 59/38; G11B 15/48; H02P 5/46
[52] U.S. Cl. .................................... 242/75.51; 318/7; 360/73
[58] Field of Search ............ 360/73; 242/75.51, 75.52, 242/190; 318/7

[56] References Cited

U.S. PATENT DOCUMENTS

| | | | |
|---|---|---|---|
| 2,874,917 | 2/1959 | Pell | 242/75.51 |
| 3,809,335 | 5/1974 | Mantey | 242/186 |
| 4,015,799 | 4/1977 | Koski et al. | 242/203 |
| 4,232,257 | 11/1980 | Harshberger, Jr. | 318/314 |
| 4,280,081 | 7/1981 | Dinger et al. | 318/6 |
| 4,322,747 | 3/1982 | Dischert et al. | 358/127 |
| 4,398,227 | 8/1983 | Anderson | 360/71 |

Primary Examiner—George G. Stellar
Attorney, Agent, or Firm—Lewis H. Eslinger; Alvin Sinderbrand

[57] ABSTRACT

Apparatus for controlling the speed of advancement of tape extending between supply and take-up reels in a VTR during changes in the speed of advancement of the tape includes for each reel a tape radius detector which detects the radius of the tape on the respective reel from the center of the reel hub to the outer loop of tape; acceleration detector which detects the acceleration or deceleration of the tape during such changes in speed; a tape tension detector which detects the tension of the tape adjacent the respective reel; a torque detector which detects the torque imparted to the respective reel by a respective drive motor at the start of the speed change; a circuit which produces a total moment of inertia signal corresponding to the total moment of inertia of the respective reel with the tape wound thereabout, in response to the detected radius, acceleration, tape tension, and torque; a torque calculating circuit which produces a torque signal corresponding to a desired torque necessary to maintain the acceleration or deceleration of the tape at a substantially constant value, in response to the detected radius, acceleration, and tape tension and the total moment of inertia signal; and a current control circuit which controls the current supplied to the respective drive motor in response to the torque signal so that the drive motor imparts a torque to the respective reel to maintain the acceleration or deceleration substantially constant.

18 Claims, 4 Drawing Figures

TAPE SPEED CONTROL APPARATUS

BACKGROUND OF THE INVENTION

1. Field of the Invention

This invention relates generally to information signal recording and reproducing appparatus and, more particularly, is directed to a tape speed control circuit for an information signal recording and reproducing apparatus.

2. Description of the Prior Art

Generally, video tape recorders (VTRs) are provided with tape tension control apparatus for maintaining the tension of the tape between the supply and take-up reels at a constant value when the speed of advancement of the tape is increased or decreased. In such case, however, the acceleration of the tape extending between the supply and take-up reels may not be constant, which may result in various problems.

For example, many VTRs are adapted to perform an editing operation. In such case, the tape speed may vary during the operation in which a search position on the tape is to be detected for use in the editing operation. Thus, if the tape speed is ten times the normal tape speed, that is, in a fast search mode, the tape speed may have to be increased to an extremely fast speed, for example, sixty times the normal tape speed, to shorten the time for detecting the search position during the editing operation. When the search position is approached, the tape speed is automatically decreased to stop at such position.

It is to be appreciated that, during the editing operation, if the acceleration or deceleration of the tape is not constant, the period during which the tape reaches a desired speed will vary. For example, during deceleration, the braking force applied to the drive motors for the take-up reel and/or supply reel, and therefore the braking time within which the tape is brought to its desired speed during the deceleration operation, cannot be accurately controlled. In addition, the amount of braking force depends on the diameter of the reel which is used and the amount of tape thereon, which makes the aforementioned control more difficult.

OBJECTS AND SUMMARY OF THE INVENTION

Accordingly, it is an object of this invention to provide a tape speed control circuit that avoids the above-described difficulties encountered with the prior art.

More particularly, it is an object of this invention to provide a tape speed control circuit in which the acceleration and deceleration of the tape is maintained constant during a tape speed change operation.

In accordance with an aspect of this invention, apparatus is provided for controlling means for advancing tape extending between first and second reels during a change in the speed of advancement of the tape, the tape being wound about the reels and having a radius associated with each reel, the apparatus comprising means for detecting the radius of the tape wound about at least one of the reels; means for detecting one of an acceleration and deceleration of the tape; means for detecting a torque imparted to at least one of the reels by the means for advancing; means for producing a total moment of inertia a first signal corresponding to the moment of inertia of at least one of the reels with the tape wound thereabout in response to the detected radius, the detected one of the acceleration and deceleration, and the detected torque; and means for controlling the means for advancing to produce a desired torque necessary to maintain the one of the acceleration and deceleration at a substantially constant value, in response to the detected radius, the detected one of the acceleration and deceleration, and the total moment of inertia signal.

The above, and other, objects, features and advantages of the invention will be apparent from the following detailed description of various embodiments of the invention which is to be read in connection with the accompanying drawings.

BRIEF DESCRIPTION OF THE DRAWINGS

FIG. 3 is a tape speed control circuit according to another embodiment of this invention.

DETAILED DESCRIPTION OF THE PREFERRED EMBODIMENTS

Figure 1:
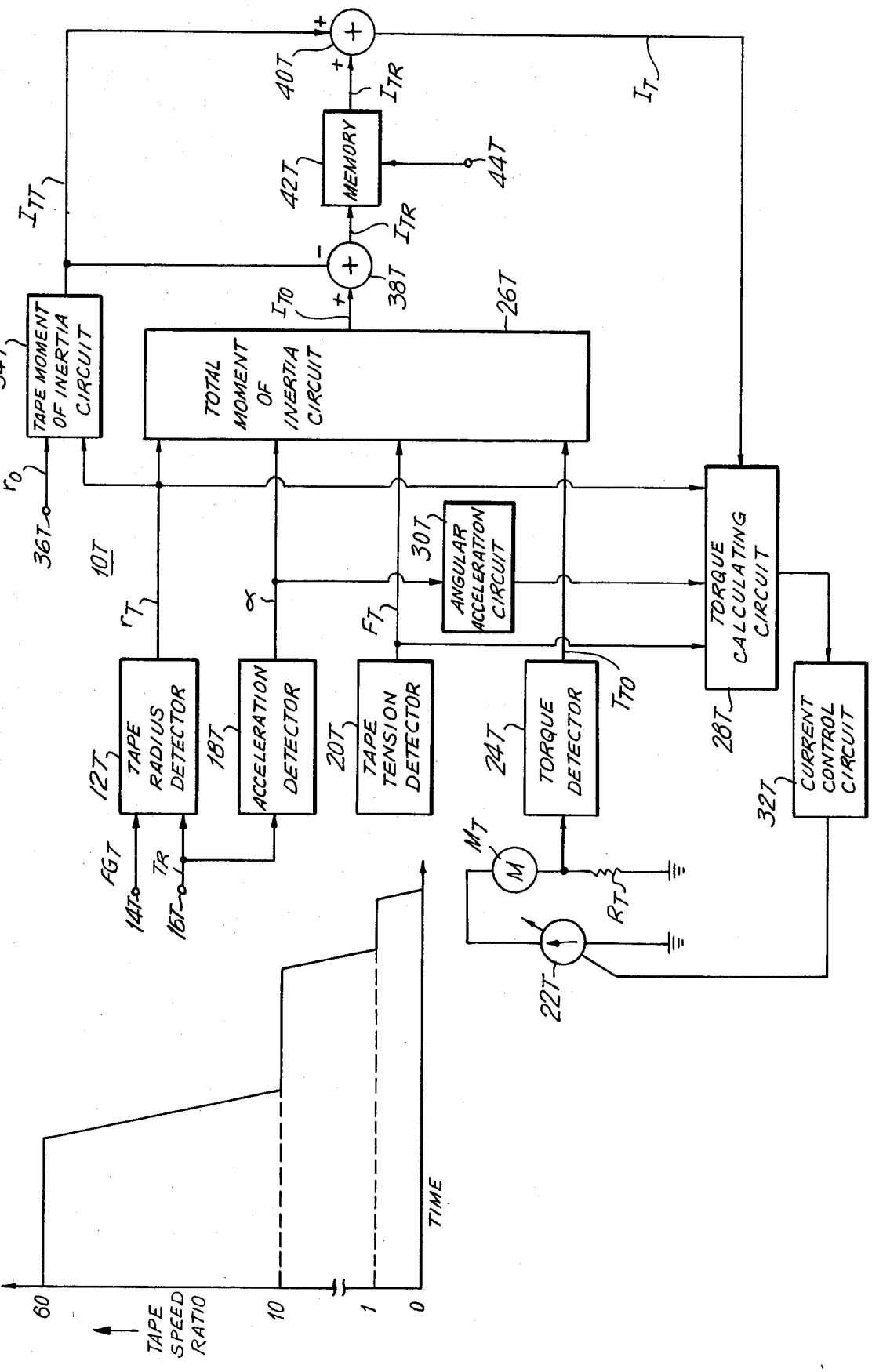
FIG. 1 is a graphical diagram of tape speed ratio versus time, illustrating changes in tape speed during an editing operation.

Before describing the specific embodiments of the present invention, the basis for this invention will first be discussed. In accordance with this invention, the torque generated by the drive motor for both the supply and take-up reels of a VTR is controlled so that the acceleration of the tape extending between the reels is constant. In particular, during acceleration or deceleration, the motor torque for each reel is determined by the tension of the tape extending between the supply reel and the take-up reel, the acceleration of the tape therebetween, the radius of the tape on the respective reel and the moment of inertia of the reel, including the tape thereon. Given that the moment of inertia of the supply reel is $I_S$ and the moment of inertia of the take-up reel is $I_T$, including the tape thereon, the following equations can be obtained:

$$I_S = \frac{r_s}{\alpha}(T_{SO} + r_s F_S) \quad (1)$$

$$I_T = \frac{r_T}{\alpha}(T_{TO} - r_T F_T), \quad (2)$$

where each of $r_s$ and $r_T$ is the combined radius of the reel hub and tape thereon with respect to the supply reel and take-up reel, respectively, $\alpha$ is the acceleration of the tape extending between the supply and take-up reels, $T_{SO}$ and $T_{TO}$ are initial values of the torque generated by the supply reel and take-up reel drive motors at the start of the acceleration or deceleration, and $F_S$ and $F_T$ are values of the tape tension at the supply reel side and take-up side, respectively. Accordingly, the values of the motor torques $T_S$ and $T_T$ for the supply reel and take-up reel can be obtained as follows:

$$T_S = \frac{\alpha}{r_S} \cdot I_S - r_S \cdot F_S \quad (3)$$

$$T_T = \frac{\alpha}{r_T} \cdot I_T + r_T \cdot F_T. \quad (4)$$

It is to be appreciated that, in the above equations (3) and (4), the acceleration corresponds to the linear change in the tape speed. In order to obtain the torques $T_S$ an $T_T$ in terms of angular speed, the following equalities are utilized:

$$\alpha = \frac{dv_S}{dt} = \frac{d\omega_S}{dt} \cdot dr_S \quad (5)$$

$$\alpha = \frac{dv_T}{dt} = \frac{d\omega_T}{dt} \cdot dr_T, \quad (6)$$

where the linear supply and take-up reel tape speeds are equal, that is, $v_T = v_S$. Accordingly, equations (3) and (4) can be rewritten as follows:

$$T_S = \frac{d\omega_S}{dt} \cdot I_S - r_S \cdot F_S \quad (7)$$

$$T_T = \frac{d\omega_T}{dt} \cdot I_T + r_T \cdot F_T, \quad (8)$$

where $\omega_S$ and $\omega_T$ are the angular speeds of the supply and take-up reels, respectively. In this manner, the values of the drive motor torques for the supply and take-up reels can be controlled so that the acceleration and deceleration is always constant when changing speed. In addition, the drive motor torques $T_S$ and $T_T$ are controlled such that the tape tension is maintained at a constant value. Thus, for example, if the tape tension changes suddenly, the drive motors function to return the value of the tape tension to a predetermined constant value.

Figure 2:
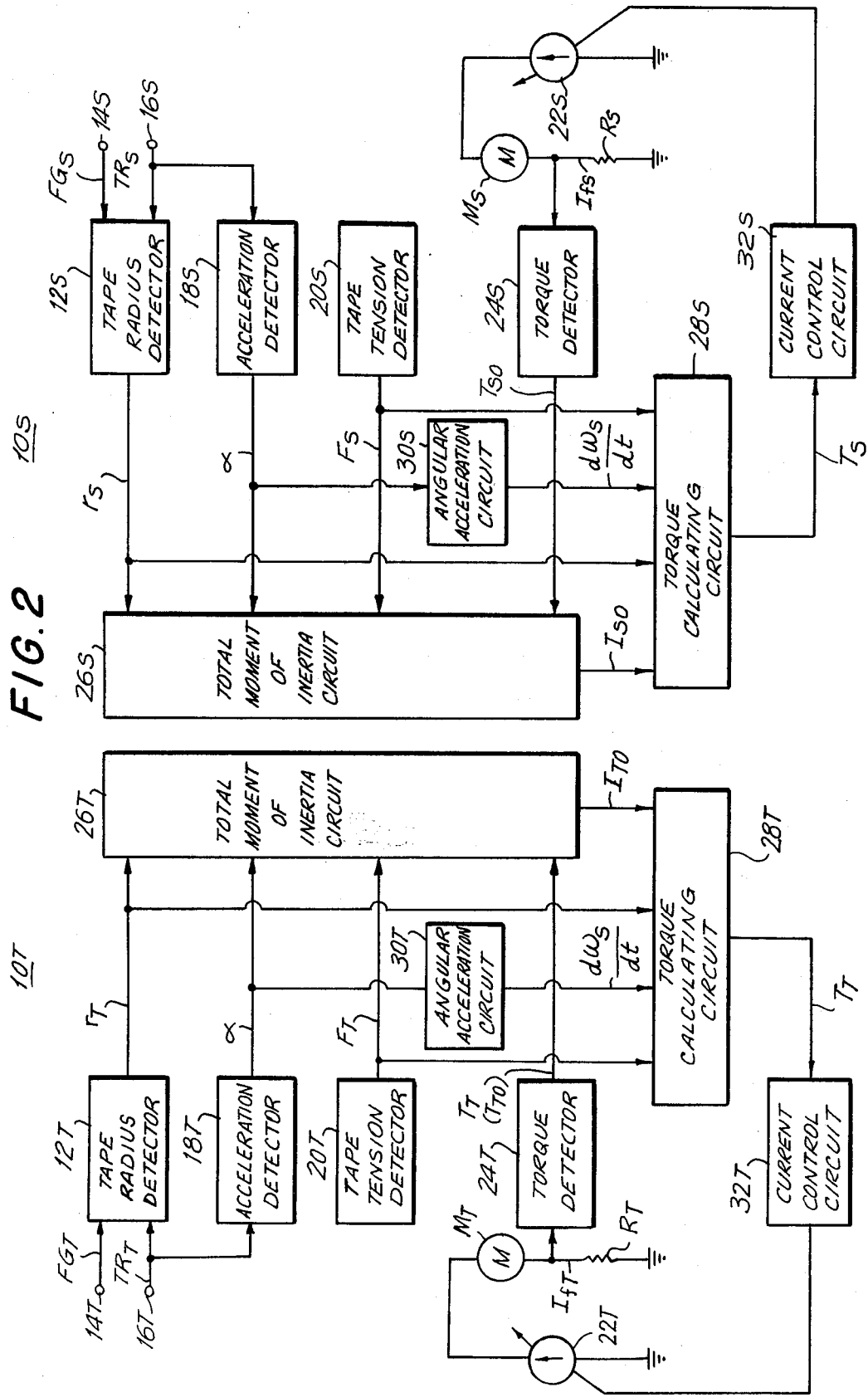
FIG. 2 is a tape speed control circuit according to one embodiment of this invention.

Referring to the drawings in detail, and initially to FIG. 2 thereof, a tape speed control circuit according to one embodiment of this invention will now be described. In the circuit of FIG. 2, reference numeral 10T refers to the control circuit for the take-up reel drive motor $M_T$ and reference numeral 10S refers to the control circuit for the supply reel drive motor $M_S$. Since the supply side control circuit 10S is substantially identical to the take-up side control circuit 10T, only control circuit 10T for take-up reel drive motor $M_T$ will be described. As shown in FIG. 2, a tape radius detector 12T detects the radius $r_T$ of the tape on the take-up reel from the center of the hub portion of the reel to the outer revolution of the tape thereon. In particular, an output signal $FG_T$ obtained from a frequency generator attached to the take-up reel drive motor $M_T$ is supplied through a terminal 14T to one input of tape radius detector 12T, and an output signal $TR_T$ corresponding to the linear speed $v_T$ of the tape is obtained from a timing roller and supplied through a terminal 16T to another input of tape radius detector 12T. In this manner, tape radius detector 12T produces an output signal corresponding to the aforementioned tape radius $r_T$ of the take-up reel in correspondence with the ratio $TR_T/FG_T$.

The output signal $TR_T$ from terminal 16T is also supplied to an acceleration detector 18T. In this regard, since output signal $TR_T$ corresponds to the linear tape speed $v_T$, acceleration detector 18T may include a differentiating circuit to obtain an output signal corresponding to the acceleration (or deceleration) $\alpha$ of the tape. Alternatively, the acceleration $\alpha$ can be obtained from the output signal $FG_T$ of the frequency generator on the supply reel side or take-up reel side. In any event, it is to be appreciated that the acceleration (or deceleration) $\alpha$ is the same for the tape on the take-up reel side and supply reel side.

The tape tension $F_T$ on the take-up reel side is detected by a tape tension detector 20T which may be comprised of a potentiometer secured to a tension arm on the take-up reel side and which produces an output signal in response thereto.

The drive motor $M_T$ for the take-up reel is supplied with a field current $I_{fT}$ from a variable current source 22T, which current flows through motor $M_T$ and a resistor $R_T$ to ground. A torque detector 24T is supplied with the field current $I_{fT}$ flowing through resistor $R_T$ and, in response thereto, produces an output signal corresponding to the torque $T_T$ imparted to the take-up reel by drive motor $M_T$. A total moment of inertia circuit 26T is supplied with the output signal from tape radius detector 12T corresponding to the tape radius $r_T$, the output signal from acceleration detector 18T corresponding to the acceleration (or deceleration) $\alpha$ of the tape, the output signal from tape tension detector 20T corresponding to the tape tension $F_T$ at the take-up reel side, and the output signal from torque detector 24T corresponding to the initial value of the generated torque $T_{TO}$, that is, when the tape speed is first changed. In response to these signals, circuit 26T produces an output signal corresponding to the initial value of the moment of inertia $I_{TO}$ for both the take-up reel and tape thereon when the speed of the tape is first changed, in accordance with equation (2). It is to be appreciated that the detection of the initial moment of inertia $I_{TO}$ can be performed for both acceleration, for example, from normal speed to 10 times normal speed or from 10 times normal speed to 60 times normal speed, or for deceleration, that is, from 60 times normal speed to 10 times normal speed or from 10 times normal speed to normal speed, as shown in FIG. 1. However, during constant tape speeds when the acceleration is zero, circuit 26T is inoperative.

A torque calculating circuit 28T is also provided for producing an output signal corresponding to a desired torque $T_T$ in which the acceleration $\alpha$ of the tape is constant during a change in speed of the tape. In particular, torque calculating circuit 28T produces an output signal corresponding to the desired torque $T_T$ in accordance with equation (8). In this manner, torque calculating circuit 28T is supplied with the output signal corresponding to the tape tension $F_T$ from tape tension detector 20T, the output signal corresponding to the tape radius $r_T$ from tape radius detector 12T, and the output signal corresponding to the initial moment of inertia $I_{TO}$ from circuit 26T. In addition, the output signal from acceleration detector 18T is supplied to an angular acceleration circuit 30T which produces an angular acceleration signal corresponding to the angular acceleration $d_t/dt$ of the take-up reel, which signal is also supplied to torque calculating circuit 28T. This latter circuit, as previously stated, produces an output torque signal $T_T$ in response to the input signals thereto. The output torque signal $T_T$ is supplied to a current control circuit 32T which controls variable current source 22T so as to vary the field current $I_{fT}$ and thereby control the torque $T_T$ generated by drive motor $M_T$ such that the acceleration (or deceleration) of the tape is maintained at a constant value. It is to be appreciated that torque calculating circuit 28S in the supply side circuit 10S performs a similar function with respect to drive motor $M_S$ for the supply reel so as to maintain the acceleration at a constant value. In any event, both circuits 10T and 10S are only operative during acceleration and deceleration periods. During constant tape speeds, a constant tape speed servo circuit (not shown) is used.

Although the tape tension $F_T$ has been used in the determinations of the initial moment of inertia $I_{TO}$ and the output torque signal $T_T$, it is possible to use a predetermined constant value therefor so as to eliminate this factor. This is because the tape tension is generally maintained within a predetermined range and can therefore be assumed constant for the above determinations.

It is to be appreciated that, with the circuit of FIG. 2, only the initial moments of inertia $I_{TO}$ and $I_{SO}$ are used to control the torque of drive motors $M_T$ and $M_S$. However, the moments of inertia $I_T$ and $I_S$ vary in accordance with changes in the tape radii $r_T$ and $r_S$, respectively. Accordingly, it may be desirable to vary the moments of inertia $I_T$ and $I_S$ in accordance with changes in the tape radaii $r_T$ and $r_S$ for a more accurate control. Thus, referring to FIG. 3, a tape speed control circuit according to another embodiment of this invention will now be described, in which elements corresponding to those described above with reference to the tape speed control circuit of FIG. 2 are identified by the same reference numerals and a detailed description thereof will be omitted herein for the sake of brevity. In the tape speed control circuit of FIG. 3, the moment of inertia $I_T$ supplied to torque calculating circuit 28T is varied in accordance with changes in the tape radius $r_T$. In particular, the total moment of inertia $I_T$ of the take-up reel and tape thereon is represented by the sum of the moment of inertia $I_{TR}$ of the reel itself, which is constant, and the amount of inertia $I_{TT}$ of the tape wound about the take-up reel, which varies. The moment of inertia $I_{TT}$ of the tape wound about the take-up reel can be expressed as follows:

$$I_{TT} = \frac{\pi \gamma h}{2g} (r_T^4 - r_0^4), \qquad (9)$$
$$= K(r_T^4 - r_0^4)$$

where $K = \pi \gamma h / 2g$, $g$ is the gravational acceleration, $\gamma$ is the tape density on the take-up reel, $h$ is the tape width and $r_0$ is the radius of the take-up reel hub. The total moment of inertia $I_T$ for the take-up reel and tape wound thereon can thus be expressed as follows:

$$I_T = I_{TT} + I_{TR} \qquad (10).$$

Rearranging the terms of equation (10), the moment of inertia $I_{TR}$ for the take-up reel by itself can be expressed as follows:

$$I_{TR} = I_T - I_{TT} \qquad (11).$$

It is to be appreciated that, as long as the radius of the take-up reel does not change, the moment of inertia $I_{TR}$ of the take-up reel is constant.

Accordingly, as shown in FIG. 3, a tape moment of inertia circuit 34T is provided for producing a tape moment of inertia signal $I_{TT}$. In particular, the output signal from tape radius detector 12T corresponding to the tape radius $r_T$ is supplied to one input of circuit 34T and a signal corresponding to the take-up reel hub radius $r_0$ is supplied to another input of circuit 34T from a terminal 36T. Accordingly, circuit 34T produces the aforementioned tape moment of inertia signal $I_{TT}$ and supplies the same to the negative or subtracting input of a subtractor 38T and to the positive input of an adder 40T. Subtractor 38T is also supplied, at a positive input thereof, with the output signal from circuit 26T corresponding to the initial total moment of inertia $I_{TO}$ and functions to subtract the tape moment of inertia signal $I_{TT}$, at a time when the speed of the tape starts to change, from the output signal from circuit 26T to produce a signal corresponding to the fixed take-up reel moment of inertia $I_{TR}$, in accordance with equation (11). This signal is then stored in a memory 42T and is continuously used in the ensuing calculations until a take-up reel having a different radius is substituted for the take-up reel presently being used. For controlling the operation of memory 42T, read and write pulses are supplied thereto from an input terminal 44T.

The output from memory 42T is supplied to another positive input of adder 40T where it is added with the varying tape moment of inertia signal $I_{TT}$ to produce a signal corresponding to the total moment of inertia $I_T$ of the reel and tape wound thereon, which varies in accordance with the tape radius $r_T$. This signal is supplied to torque calculating circuit 28T along with the output signals from tape radius detector 12T, angular acceleration circuit 30T and tape tension detector 20T, as previously discussed in regard to the circuit of FIG. 2. The remainder of the circuit of FIG. 3 is identical to that shown in FIG. 2 and a description thereof will not be repeated herein. Accordingly, more accurate control of the torque generated by motor $M_T$ can be obtained with the circuit of FIG. 3. It is to be appreciated that although the portion of the circuit of FIG. 3 that relates only to the take-up reel side has been discussed, a corresponding circuit for the supply reel side is also provided.

Figure 4:
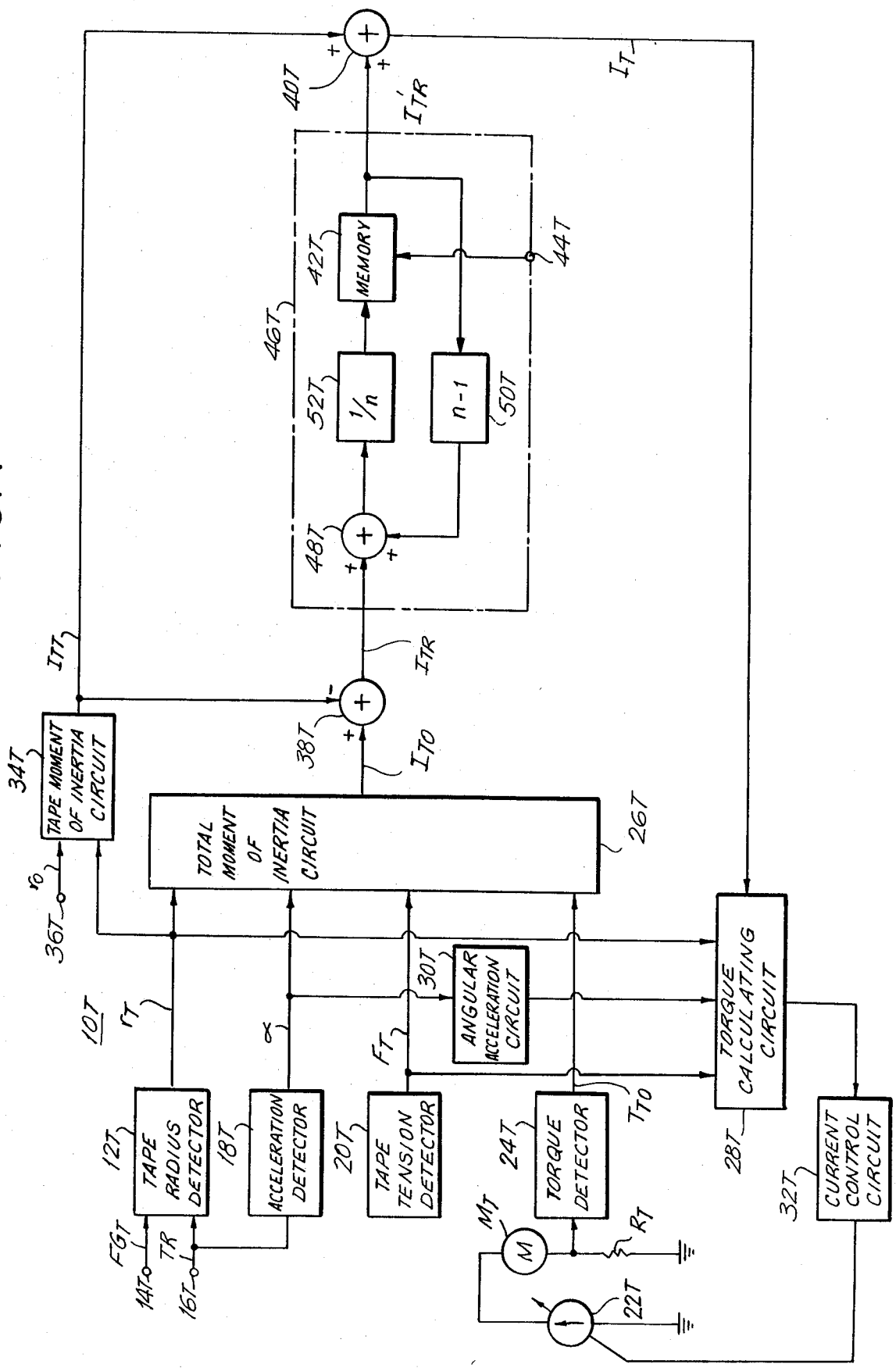
FIG. 4 is a tape speed control circuit according to still another embodiment of this invention.

With the circuit of FIG. 3, if the reel moment of intertia $I_{TR}$ is recalculated each time that the tape speed is increased or decreased, it is better for stability to use a weighted reel moment of inertia with respect to previously produced data. Therefore, in accordance with another embodiment of this invention, as shown in FIG. 4, a weighting or averaging operation is effected with respect to the total moment of inertia $I_T$ to provide good stability for the circuit. Thus, rather than using newly-obtained data, the total moment of inertia $I_T$ is weighted by weighting the reel moment of inertia $I_{TR}$ to produce a weighted reel moment of inertia $I_{TR}'$, as follows:

$$I_{TR}'(n) = \frac{1}{n} \{(n-1)I_{TR}(n-1) + I_{TR}(n)\}, \qquad (12)$$

where n refers to the n-th or newly obtained data and (n−1) refers to the data obtained in the most previous calculation.

The weighting operation of equation (12) is performed by a weighting or average data forming circuit 46T in the circuit of FIG. 4, in which elements corresponding to those described above with reference to the circuit of FIG. 3 are identified by the same reference numerals and a detailed description thereof will be omitted herein for the sake of brevity. In particular, the obtained reel moment of inertia $I_{TR}$ from subtractor 38T is supplied to a positive input of an adder 48T. It is to be appreciated that this input to adder 48T corresponds to the newly-obtained data, that is, the reel moment of inertia $I_{TR}(n)$ in equation (12). The previously obtained moment of inertia $I_{TR}(n-1)$ stored in memory 42T is weighted by the factor (n−1) in weighting circuit 50T and the weighted output therefrom is supplied to another positive input of adder 48T which combines the two signals supplied thereto. The output of adder 48T is weighted by the factor 1/n in weighting circuit 52T and the resultant or weighted moment of inertia $I_{TR}'$ is then stored in memory 42T. The weighted moment of inertia $I_{TR}'$ from memory 42T is then supplied to the aforementioned positive input of adder 40T and combined with the tape moment of inertia $I_{TT}$ supplied to the other positive input of adder 40T to produce an output signal corresponding to the total moment of inertia $I_T$ which is supplied to torque calculating circuit 28T, as previously described in the circuit of FIG. 4. The remainder of the circuit of FIG. 4 is identical to that previously discussed in regard to FIG. 3. It is to be appreciated that although the portion of the circuit of FIG. 4 that relates only to the take-up reel side has been discussed, a corresponding circuit for the supply reel side is also provided.

Accordingly, with the tape speed control circuits according to all of the embodiments described above, acceleration and deceleration of the tape will be maintained constant. Also, since the drive motor torques for the take-up reel and supply reel are controlled so that the tape acceleration and deceleration are constant during changes in the speed of advancement of the tape, the braking force applied to the drive motors, and therefore the braking periods, can be accurately controlled, during acceleration of the tape. Further, the braking forces and respective braking times are also accurately controlled, even when the radaii of the reels vary, since the motor torques are controlled in response to the radii of the take-up and supply reels. Also, in the embodiments of FIGS. 3 and 4, since the total moments of inertia $I_T$ and $I_S$ vary in accordance with changes in the radius of the tape thereon, control of the drive motors is greatly improved.

It is to be appreciated that various modifications within the scope of this invention can be made to the circuits shown in FIGS. 2–4. For example, instead of using the linear tape acceleration to determine the total moments of inertia $I_T$ and $I_S$, such moments of inertia can be calculated from the respective angular accelerations at the take-up reel and supply reel sides. In addition, as previously discussed, the tape tension $F_T$ (and $F_S$) may be assumed constant. Thus, tape tension detectors 20T and 20S may be eliminated.

Having described specific preferred embodiments of the invention with reference to the accompanying drawings, it is to be understood that the invention is not limited to those precise embodiments and that various changes and modifications may be effected therein by one skilled in the art without departing from the scope or spirit of the invention as defined in the appended claims.

I claim:

1. Apparatus for controlling means for advancing tape extending between first and second reels during a change in the speed of advancement of said tape, said tape being wound about said reels and having a radius associated with each reel, said apparatus comprising:
    means for detecting the radius of said tape wound about at least one of said reels;
    means for detecting one of an acceleration and deceleration of said tape;
    means for detecting a torque imparted to at least one of said reels by the means for advancing;
    means for producing a total moment of inertia signal corresponding to the total moment of inertia of at least one of said reels with said tape wound thereabout, in response to said detected radius, said detected one of said acceleration and deceleration, and said detected torque; and
    means for controlling said means for advancing to produce a desired torque necessary to maintain said one of said acceleration and deceleration at a substantially constant value, in response to said detected radius, said detected one of said acceleration and deceleration and said total moment of inertia signal.

2. Apparatus according to claim 1; in which said means for advancing includes a first drive motor for rotating said first reel and a second drive motor for rotating said second reel.

3. Apparatus according to claim 1; in which said means for controlling includes means for producing an output signal corresponding to said desired torque in response to said detected radius, said detected one of said acceleration and deceleration and said total moment of inertia signal; current source means for supplying current to said means for advancing; and current control means for controlling said current source means in response to said output signal corresponding to said desired torque so that said means for advancing produces said desired torque necessary to maintain said one of said acceleration and deceleration at a substantially constant value.

4. Apparatus according to claim 1; in which said tape has a tension associated therewith, and further including means for detecting said tape tension.

5. Apparatus according to claim 4; in which said means for producing said total moment of inertia signal produces said total amount of inertia signal in response to said detected radius, said detected one of said acceleration and deceleration, said detected torque and said detected tape tension.

6. Apparatus according to claim 4; in which said means for controlling controls said means for advancing in response to said detected radius, said detected one of said acceleration and deceleration, said detected torque and said detected tape tension.

7. Apparatus according to claim 1; in which said means for detecting said one of said acceleration and deceleration includes means for detecting one of a linear acceleration and linear deceleration of said tape and means for producing a signal corresponding to one of an angular acceleration and angular deceleration of said tape wound about said reels in response to said detected linear acceleration and linear deceleration, respectively; and said means for controlling controls said means for advancing in response to said detected radius, said signal corresponding to one of an angular acceleration and angular deceleration, and said total moment of inertia signal.

8. Apparatus according to claim 1; in which said total moment of inertia signal corresponds only to the total moment of inertia at the start of one of said acceleration and deceleration of said tape.

9. Apparatus according to claim 1; in which said total moment of inertia signal varies during said one of said acceleration and deceleration of said tape in response to the radius of said tape wound about at least one of said reels.

10. Apparatus according to claim 9; in which said means for producing said total moment of inertia signal includes means for producing a tape moment of inertia signal corresponding only to the moment of inertia of said tape wound about at least one of said reels; means for producing a reel moment of inertia signal corresponding to the moment of inertia of at least one of said reels without the tape wound thereabout; and means for combining said tape moment of inertia signal and said reel moment of inertia signal to produce said total moment of inertia signal.

11. Apparatus according to claim 10; in which said means for producing said tape moment of inertia signal is supplied with a signal corresponding to said detected radius and a signal corresponding to the radius of a hub of at least one of said reels.

12. Apparatus according to claim 10; in which said means for producing said reel moment of inertia signal includes means for producing an initial total moment of inertia signal corresponding only to the moment of inertia of at least one of said reels with said tape wound thereabout at the start of one of said acceleration and deceleration of said tape; and subtractor means for subtracting said tape moment of inertia signal at the start of one of said acceleration and deceleration of said tape from said initial total amount of inertia signal to produce said reel moment of inertia signal.

13. Apparatus according to claim 10; in which said means for producing said total moment of inertia signal includes means for storing said reel moment of inertia signal and for supplying said reel moment of inertia signal to said means for combining.

14. Apparatus according to claim 10; in which said means for producing said total moment of inertia signal includes means for weighting said total moment of inertia signal with at least a portion of a previously-produced total moment of inertia signal.

15. Apparatus according to claim 14; in which said means for weighting weights said reel moment of inertia signal with a previously-produced reel moment of inertia signal to produce an output weighted reel moment of inertia signal.

16. Apparatus according to claim 15; in which said means for producing said total reel moment of inertia signal includes means for producing an initial total moment of inertia signal corresponding to the moment of inertia of at least one of said reels with said tape wound thereabout at the start of one of said acceleration and deceleration of said tape; and subtractor means for subtracting said tape moment of inertia signal at the start of one of said acceleration and deceleration of said tape from said initial total moment of inertia signal to produce said reel moment of inertia signal.

17. Apparatus according to claim 16; in which said means for weighting includes means for weighting said previously-produced reel moment of inertia signal by a factor $(n-1)$ to produce a weighted previously-produced reel moment of inertia signal, where n corresponds to the number of reel moment of inertia signals previously produced, means for combining said weighted previously-produced reel moment of inertia signal and said reel moment of inertia signal to produce a first output signal; and means for weighting said first output signal by a factor $(1/n)$ to produce said output weighted reel moment of inertia signal.

18. Apparatus according to claim 17; in which said first-mentioned means for combining combines said tape moment of inertia signal and said output weighted reel moment of inertia signal to produce said total moment of inertia signal.

* * * * *